(12) United States Patent
Sonoda et al.

(10) Patent No.: US 11,036,088 B2
(45) Date of Patent: Jun. 15, 2021

(54) LIQUID CRYSTAL DISPLAY DEVICE

(71) Applicant: Japan Display Inc., Minato-ku (JP)

(72) Inventors: Hidehiro Sonoda, Tokyo (JP); Masahiro Kosuge, Tokyo (JP); Yasushi Tomioka, Tokyo (JP); Takenori Hirota, Tokyo (JP); Noboru Kunimatsu, Tokyo (JP)

(73) Assignee: Japan Display Inc., Minato-ku (JP)

( * ) Notice: Subject to any disclaimer, the term of this patent is extended or adjusted under 35 U.S.C. 154(b) by 131 days.

(21) Appl. No.: 16/143,796

(22) Filed: Sep. 27, 2018

(65) Prior Publication Data
US 2019/0094627 A1 Mar. 28, 2019

(30) Foreign Application Priority Data
Sep. 28, 2017 (JP) .............................. JP2017-189147

(51) Int. Cl.
G02F 1/1337 (2006.01)
C09K 19/56 (2006.01)
G02F 1/1343 (2006.01)
C09K 19/54 (2006.01)

(52) U.S. Cl.
CPC ...... *G02F 1/133711* (2013.01); *C09K 19/542* (2013.01); *C09K 19/56* (2013.01); *G02F 1/133723* (2013.01); *G02F 1/134309* (2013.01); *C09K 2323/02* (2020.08); *C09K 2323/025* (2020.08); *C09K 2323/027* (2020.08); *G02F 2201/121* (2013.01); *G02F 2201/123* (2013.01)

(58) Field of Classification Search
CPC ......... G02F 1/133723; G02F 1/134309; G02F 2201/121; G02F 2201/123; G02F 1/133711; G02F 1/133788; C09K 19/542; C09K 19/56; C09K 2323/02; C09K 2323/025; C09K 2323/027; Y10T 428/1018; Y10T 428/1023
See application file for complete search history.

(56) References Cited

U.S. PATENT DOCUMENTS

2011/0199565 A1* 8/2011 Kunimatsu ............ C09K 19/56
349/123
2013/0128204 A1* 5/2013 Mizusaki .............. C08F 220/18
349/130

(Continued)

FOREIGN PATENT DOCUMENTS

JP 2013-174666 9/2013

*Primary Examiner* — Sophie Hon
(74) *Attorney, Agent, or Firm* — Oblon, McClelland, Maier & Neustadt, L.L.P.

(57) ABSTRACT

According to one embodiment, a liquid crystal display device includes a first substrate, a second substrate disposed to oppose the first substrate, a layer of liquid crystal located between the first substrate and the second substrate, and an alignment film disposed on the first substrate so as to be in contact with the layer of the liquid crystal. The liquid crystal has a refractive-index anisotropy Δn of 0.11 or more, the layer of the liquid crystal has a thickness d of 2.5 μm or less, and a product Δnd of the refractive-index anisotropy Δn and the thickness d is 0.20 or more but 0.31 or less. The transmissivity of light having a wavelength of 450 nm in the first substrate and the alignment film is 85% or more but 97% or less.

10 Claims, 5 Drawing Sheets

| dμm | Δn dμm | x | y | Y |
|---|---|---|---|---|
| 3 | 0.399 | 0.332 | 0.356 | 20.3 |
| 2.9 | 0.386 | 0.327 | 0.352 | 20.1 |
| 2.8 | 0.372 | 0.323 | 0.348 | 19.9 |
| 2.7 | 0.359 | 0.319 | 0.344 | 19.6 |
| 2.6 | 0.346 | 0.314 | 0.339 | 19.1 |
| 2.5 | 0.333 | 0.310 | 0.335 | 18.6 |
| 2.4 | 0.319 | 0.306 | 0.330 | 18.0 |
| 2.3 | 0.306 | 0.302 | 0.326 | 17.3 |
| 2.2 | 0.293 | 0.298 | 0.321 | 16.5 |
| 2.1 | 0.279 | 0.294 | 0.317 | 15.6 |
| 2 | 0.266 | 0.291 | 0.312 | 14.6 |

(56) References Cited

U.S. PATENT DOCUMENTS

| | | | |
|---|---|---|---|
| 2014/0036538 A1* | 2/2014 | You | G09F 13/0409 362/613 |
| 2014/0225036 A1* | 8/2014 | Kaneoya | C09K 19/20 252/299.61 |
| 2014/0248445 A1* | 9/2014 | Tomioka | G02F 1/133788 428/1.27 |

* cited by examiner

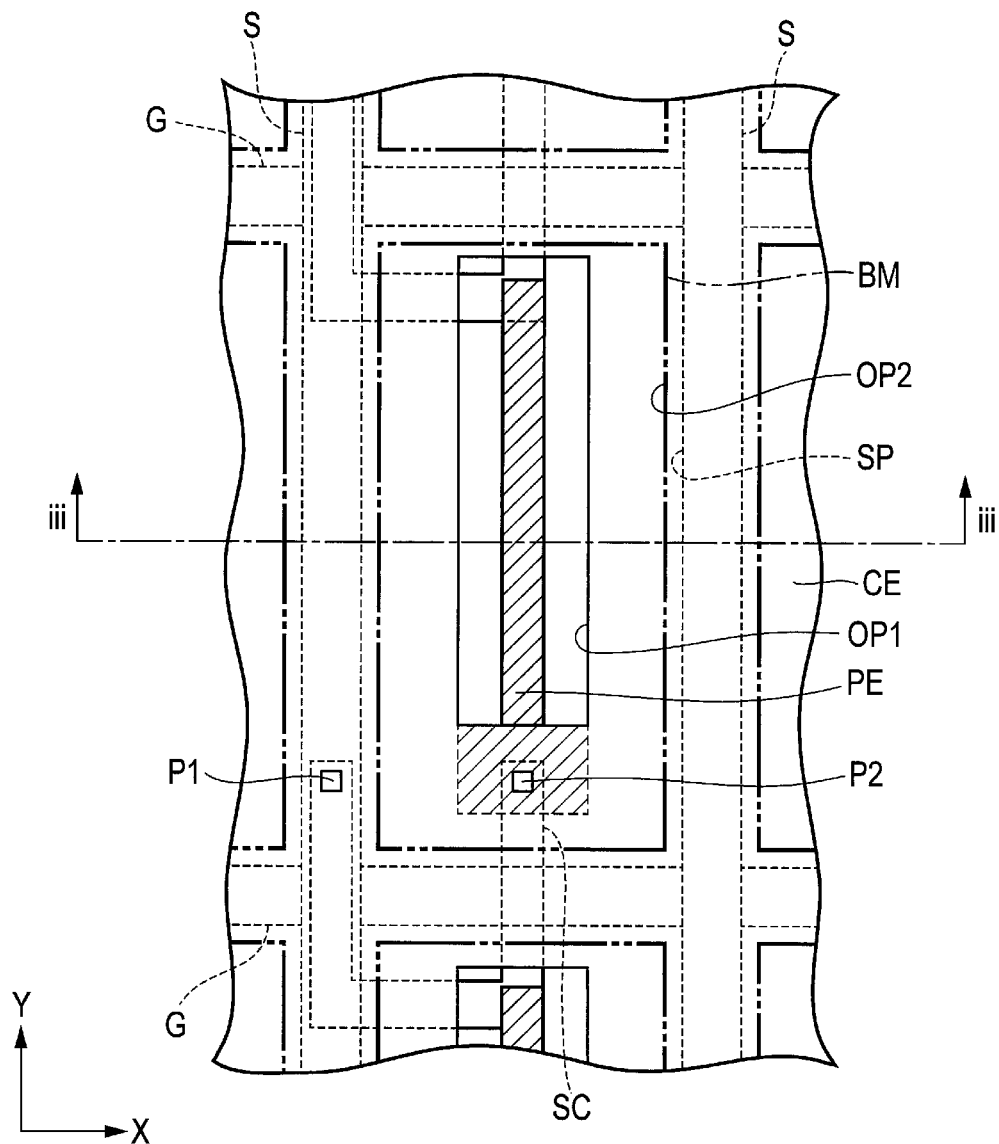
F I G. 2

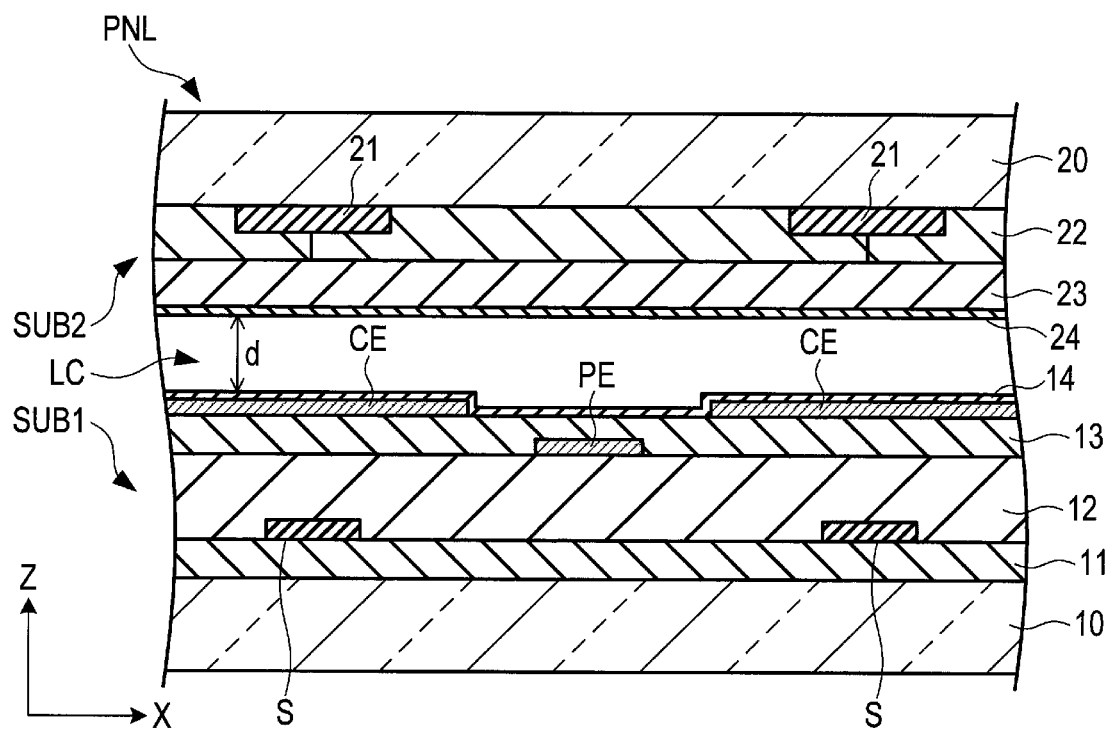
F I G. 3
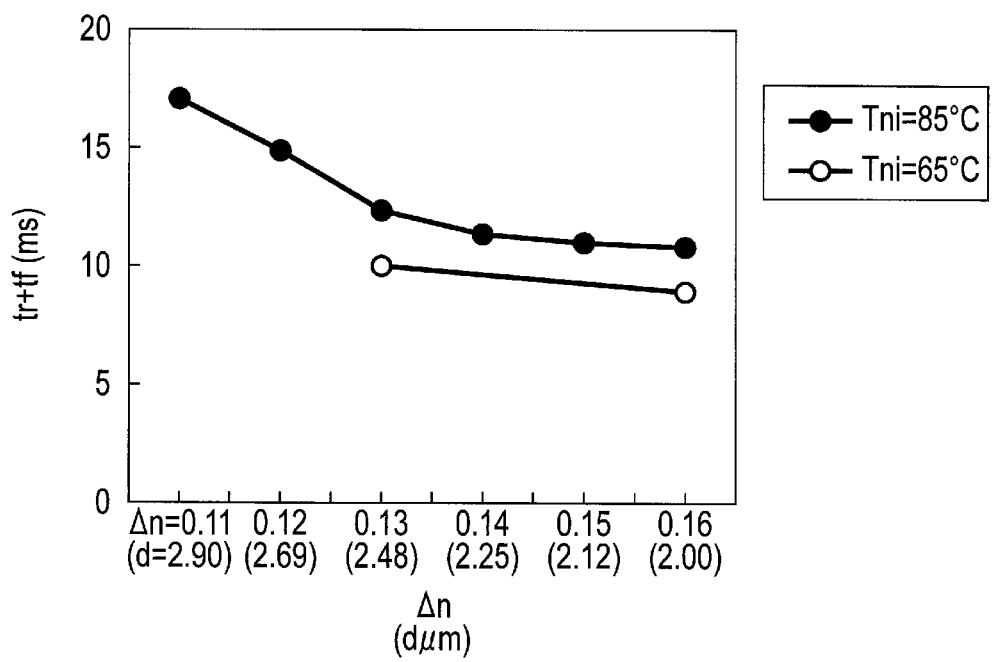
F I G. 4

| dμm | Δn dμm | x | y | Y |
|---|---|---|---|---|
| 3 | 0.399 | 0.332 | 0.356 | 20.3 |
| 2.9 | 0.386 | 0.327 | 0.352 | 20.1 |
| 2.8 | 0.372 | 0.323 | 0.348 | 19.9 |
| 2.7 | 0.359 | 0.319 | 0.344 | 19.6 |
| 2.6 | 0.346 | 0.314 | 0.339 | 19.1 |
| 2.5 | 0.333 | 0.310 | 0.335 | 18.6 |
| 2.4 | 0.319 | 0.306 | 0.330 | 18.0 |
| 2.3 | 0.306 | 0.302 | 0.326 | 17.3 |
| 2.2 | 0.293 | 0.298 | 0.321 | 16.5 |
| 2.1 | 0.279 | 0.294 | 0.317 | 15.6 |
| 2 | 0.266 | 0.291 | 0.312 | 14.6 |

LIQUID CRYSTAL DISPLAY DEVICE

CROSS-REFERENCE TO RELATED APPLICATIONS

This application is based upon and claims the benefit of priority from Japanese Patent Application No. 2017-189147, filed Sep. 28, 2017, the entire contents of which are incorporated herein by reference.

FIELD

Embodiments described herein relate generally to a liquid crystal display device.

BACKGROUND

Liquid crystal display devices comprise a first substrate on which pixel electrodes, thin-film transistors (TFTs) and the like are formed in a matrix, and a second substrate disposed to be spaced from the first substrate so as to oppose thereto, on which color filters and the like are formed. Liquid crystals are enclosed between the first substrate and the second substrate. The liquid crystals are aligned by alignment films provided respectively in the first and second substrates.

Recently, there is a demand of further improving the display quality in the liquid crystal display devices. In order to achieve a higher display quality, it is required to increase the response speed of the liquid crystal display device. In order to increase the response speed of the liquid crystal display device, the thinning of the liquid crystal layer has been proposed.

BRIEF DESCRIPTION OF THE DRAWINGS

FIG. 2 is a plan view showing a configuration example of a subpixel of the liquid crystal display device illustrated in FIG. 1.

FIG. 3 is a schematic cross sectional view of a display panel taken along line iii-iii in FIG. 2.

FIG. 4 is a graph showing the relationship between a gap width d and refractive-index anisotropy $\Delta n$, and a response speed tr+tf.

DETAILED DESCRIPTION

Figure 1:
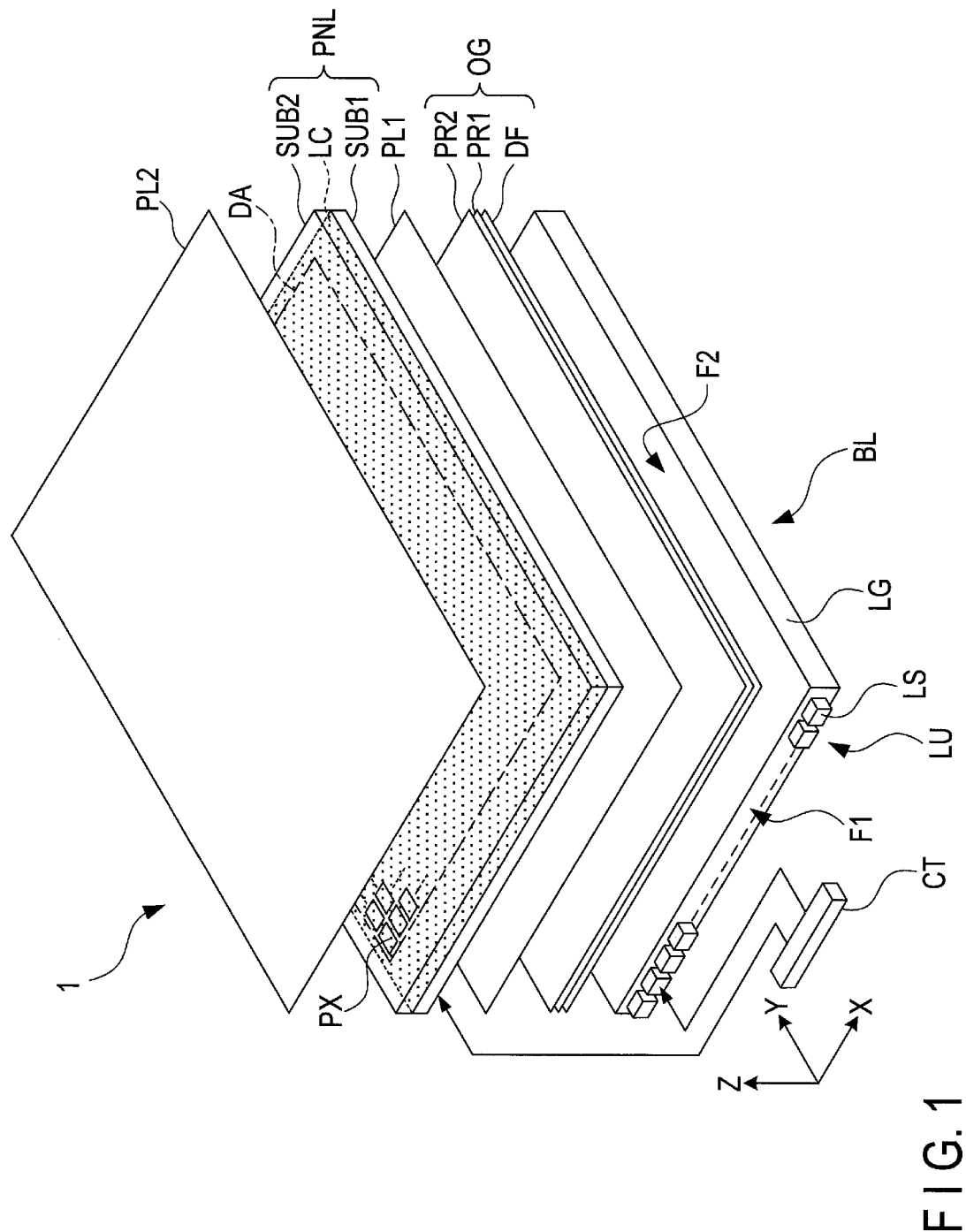
FIG. 1 is an exploded perspective view schematically showing a configuration example of a liquid crystal display device according to an embodiment.

In general, according to a first embodiment, a liquid crystal display device comprises a first substrate; a second substrate disposed to oppose the first substrate; a layer of liquid crystal located between the first substrate and the second substrate; and an alignment film disposed on the first substrate so as to be in contact with the layer of the liquid crystal, the liquid crystal having a refractive-index anisotropy $\Delta n$ of 0.11 or more, the layer of the liquid crystal having a thickness d of 2.5 μm or less, and a product $\Delta nd$ of the refractive-index anisotropy $\Delta n$ and the thickness d being 0.20 or more but 0.31 or less, and a transmissivity of light having a wavelength of 450 nm in the first substrate and the alignment film being 85% or more but 97% or less.

According to a second embodiment, a liquid crystal display device comprises a first substrate; a second substrate disposed to oppose the first substrate; a layer of liquid crystal located between the first substrate and the second substrate; and an alignment film disposed on the first substrate so as to be in contact with the layer of the liquid crystal, the liquid crystal having a refractive-index anisotropy $\Delta n$ of 0.11 or more, the layer of the liquid crystal having a thickness d of 2.5 μm or less, and a product $\Delta nd$ of the refractive-index anisotropy $\Delta n$ and the thickness d being 0.20 or more but 0.31 or less, and the alignment film containing a first polyimide which has a skeleton originated from aromatic tetracarboxylic acid as a tetracarboxylic acid component, or a polymer compound which has an azobenzene skeleton, a cinnamate skeleton or a stilbene skeleton.

In order to achieve high display quality, it is not sufficient only to increase the response speed of the liquid crystal display device. The liquid crystal display device exhibiting high display quality is also required to be able to faithfully reproduce the colors of an object to be displayed.

The authors of the embodiments have devised a liquid crystal display device with improved response speed and color reproducibility, that is, improved display quality.

Some embodiments will be described hereinafter with reference to drawings. The disclosure is merely an example, and proper changes within the spirit of the invention, which are easily conceivable by a skilled person, are included in the scope of the invention as a matter of course. In addition, in some cases, in order to make the description clearer, the drawings may be more schematic than in the actual modes, but they are mere examples, and do not limit the interpretation of the present invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In the present specification, expressions such as "α includes A, B, or C", "α includes any one of A, B, and C", and "α includes an element selected from a group consisting of A, B, and C" do not exclude a case where α includes combinations of A, B, and C unless otherwise specified. Furthermore, these expressions do not exclude a case where α includes other elements.

<Configuration of Liquid Crystal Display Device>

First, a liquid crystal display device according to an embodiment will be described with reference to FIGS. 1, 2, and 3. FIG. 1 is an exploded perspective view schematically showing a configuration example of the liquid crystal display device according to the embodiment. FIG. 2 is a plan view showing a configuration example of a subpixel of the liquid crystal display device illustrated in FIG. 1. FIG. 3 is a schematic cross sectional view of a display panel taken along line iii-iii in FIG. 2.

As shown in FIG. 1, a liquid crystal display device 1 is a transmissive liquid crystal display device comprising a display panel PNL and an illumination device BL as a backlight. The first direction X, the second direction Y, and the third direction Z are defined as illustrated. The respective directions X, Y, and Z are orthogonal to each other in the embodiment, but may intersect at an angle other than a right angle. In the present disclosure, a direction indicated by an arrow of the third direction Z is referred to as "above/over", and an opposite direction of the arrow is referred to as "under/below".

In the example of FIG. 1, the illumination device BL is a side-edge type backlight which comprises a light guide plate LG opposing the display panel PNL and a light source unit LU. But, the structure of the illumination device BL is not limited to the example shown in FIG. 1 but may be a structure configured to supply light necessary for image display. For example, the illumination device BL may be the so-called directly under type backlight which comprises a light source disposed under the display panel PNL.

In the example of FIG. 1, each of the display panel PNL and the light guide plate LG is formed in a rectangular shape having shorter sides in the first direction X and longer sides in the second direction Y. The shape of each of the display panel PNL and the light guide plate LG is not limited to a rectangular shape, but may be some other shape.

The light source unit LU comprises a plurality of light sources LS arranged in the first direction X along a light incidence surface F1 (side surface) of the light guide plate LG. The light source LS is, for example, a light-emitting diode but may be a light-emitting element of the other type such as an organic electroluminescent element. The light from the light sources LS is made incident on the light guide plate LG from the light incidence surface F1 and emitted from a light emission surface F2 opposing the display panel PNL.

The display panel PNL is a transmissive liquid crystal panel, and comprises a first substrate SUB1, a second substrate SUB2 opposing the first substrate SUB1, and a liquid crystal layer LC enclosed between these substrates SUB1 and SUB2. The display panel PNL includes a display area DA including a plurality of pixels PX. The plurality of pixels PX is arrayed in a matrix along the first direction X and the second direction Y.

The liquid crystal display device 1 further comprises an optical sheet group OG, a first polarizer PL1 and a second polarizer PL2, which transmit polarized light, and a controller CT. The optical sheet group OG includes, for example, a diffusion sheet DF which diffuses the light emitted from the light emission surface F2, and a first prism sheet PR1 and a second prism sheet PR2, on which a number of prism lenses are formed and light diffused by the diffusion sheet is converged in the display area of the display panel PNL to improve the luminance of the screen. The first polarizer PL1 is disposed between the optical sheet group OG and the first substrate SUB1. The second polarizer PL2 is disposed above the second substrate SUB2.

The controller CT controls the display panel PNL and the light source unit LU. For example, the controller CT can be composed of IC and various circuit elements. The controller CT may be composed of IC which controls the display panel PNL and IC which controls the light source unit LU. In this case, the respective ICs may be disposed at positions remote from each other.

The liquid crystal display device 1 can be used for various devices, for example, a smartphone, a tablet terminal, a mobile telephone, a personal computer, a television receiver, a vehicle-mounted device, a game console, a head-mounted display, and the like.

The display panel PNL shown in FIG. 1 contains a plurality of subpixels of different colors shown in FIG. 2.

As shown in FIG. 2, the display panel PNL comprises a plurality of scanning line G and a plurality of video lines S which intersect these scanning lines G. The scanning lines G each extend along the first direction X and are arranged along the second direction Y to be spaced from each other. The video lines S each extend along the second direction Y and are arranged along the first direction X to be spaced from each other.

A region enclosed by each adjacent pair of the video lines S and each adjacent pair of the scanning lines G is equivalent to a subpixel SP (subpixel region). Each subpixel SP is provided with a pixel electrode PE and a semiconductor layer SC. The semiconductor layer SC is connected to a respective signal line S in a first position P1 and is connected to a pixel electrode PE in a second position P2. FIG. 2 illustrates a double-gate structure, in which the semiconductor layer SC intersects a respective scanning line G twice. The pixel electrode PE forms, together with the semiconductor layer SC, an electrode portion without a branch portion in plan view. Further, a portion of the pixel electrode PE is not superimposed on any common electrode CE, which will be described later. Here, the semiconductor layer SC may be of some other kind of structure such as a single gate type, in which it intersects the scanning line G only once.

Common electrodes CE are disposed above the pixel electrode PE (FIG. 3). The common electrodes CE each comprise a first opening OP1 in each subpixel SP. The pixel electrode PE extends to cross the first opening OP1.

Light-shielding layers 21 are disposed above the common electrodes CE (FIG. 3). The light-shielding layers 21 oppose the scanning lines G, the video lines S and the semiconductor layer SC. The light-shielding layers 21 each define a second opening OP2 in a region of each subpixel SP. The region in the second opening OP2 is a region which contributes to display. The first opening OP1 is located within the second opening OP2 in plan view.

As shown in FIG. 3, the first substrate SUB1 comprises a first base 10, which is, for example, a glass or resin substrate, a first insulating layer 11, a second insulating layer 12, and a third insulating layer 13. The first insulating layer 11 covers the first base 10. The video lines S are provided on the first insulating layer 11. The second insulating layer 12 covers the signal lines S and the first insulating layer 11. The pixel electrode PE is disposed on the second insulating layer 12. The third insulating layer 13 covers the pixel electrode PE and the second insulating layer 12. A first alignment film 14 is provided to cover the common electrode CE and the third insulating layer 13.

The second substrate SUB2 comprises a second base 20, which is, for example, a glass or resin substrate, the above light-shielding layers 21, color filters 22, and an overcoat layer 23. The light-shielding layers 21 are disposed under the second base 20. The color filters 22 cover the second base 20 and the light-shielding layers 21. A boarder between each adjacent pair of color filters 22 is superimposed on the respective light-shielding layer 21. The overcoat layer 23 covers the color filters 22. A second alignment film 24 is provided to cover the overcoat layer 23.

Between the first alignment film 14 and the second alignment film 24, a gap having a width of d is formed. The liquid crystal layer LC is disposed between these alignment films 14 and 24. A thickness of the liquid crystal layer LC is equal to the width d of the gap. The liquid crystal layer LC is formed from a liquid crystal material (liquid crystal mixture) with a refractive-index anisotropy $\Delta n$.

There are positive and negative type liquid crystal materials usable for the liquid crystal layer LC, in which dielectric anisotropy Δε is positive or negative, respectively. Generally, the positive type is lower in rotational viscosity coefficient as compared to the negative type.

Recently, there is a great demand of further improving the display quality in the liquid crystal display devices. In order to achieve high display quality, the response speed of the liquid crystal display device needs to be increased. As will be described later, in order to increase the response speed, it is more advantageous if the liquid crystal material to be used for liquid crystal layer LC has lower rotational viscosity coefficient. Therefore, in the liquid crystal display device 1 of this embodiment, the liquid crystal layer LC is formed from a positive type liquid crystal material.

As shown in FIG. 3, in this embodiment, the pixel electrode PE and the common electrodes CE are disposed in the first substrate SUB1. More specifically, the common electrode CE is closer to the liquid crystal layer LC than the pixel electrodes PE, in the first substrate SUB1. If a voltage is applied to the pixel electrode PE via the video lines S and the semiconductor layer SC, a lateral electric field is generated between the pixel electrode PE and the common electrodes CE. The liquid crystal molecules of the liquid crystal layer LC rotate by the action of the lateral electric field.

The cross-sectional structure of the display panel PNL is not limited to the example shown in FIG. 3. For example, the pixel electrode PE and the common electrodes CE may be disposed in the same layer. The pixel electrode PE may be disposed in a layer closer to the liquid crystal layer LC than the common electrodes CE. In addition, the color filters 22 and the light-shielding layers 21 may be disposed in the first substrate SUB1.

The response speed of the liquid crystal display device can be defined as a total of a rise time tr in which the light transmissivity of the display panel PNL in the initial state reaches a predetermined level when an electric field is applied to the liquid crystal layer LC and a fall time tf in which the transmissivity in the predetermined level lowers to the initial state when application of the electric field to the liquid crystal layer LC is stopped (tr+tf). In general, the rise time tr and fall time tf can be represented by the following expressions (1) and (2) using rotational viscosity coefficient γ1 of the liquid crystal material, vacuum dielectric constant ε0 of the liquid crystal material, dielectric anisotropy Δε of the liquid crystal material, force E of the electric field applied to the liquid crystal layer LC, elastic constant K22 of torsional deformation of the liquid crystal material, and the gap width d.

$$tr = \gamma 1 / (\varepsilon 0 \cdot \Delta\varepsilon \cdot E^2 - (\pi^2/d^2) K22) \quad (1)$$

$$tf = (\gamma 1 \cdot d^2) / (\pi^2 \cdot K22) \quad (2)$$

FIG. 4 is a graph showing results of simulation of a relationship between Δn and tr+tf, in the display panel PNL having the structure shown in FIGS. 2 and 3. In FIG. 4, the horizontal axis indicates the refractive-index anisotropy Δn and the vertical axis indicates the response time tr+tf [ms]. In FIG. 4, the gap width d [μm] for each Δn was set such that Δnd was constant at approximately 0.32 μm. The value of the gap width d is written under each Δn. The simulations were executed when transition temperature Tni of the liquid crystal material was 85° C. and 65° C.

The reason for setting Δnd to constant approximately at 0.32 μm is that in a common display panel, Δnd is set to 0.32 to 0.34 μm in consideration of the color of the light after passing through the display panel. If Δnd is set to 0.32 to 0.34 μm, the color of the light after passing through the display panel PNL becomes white. Note that Δn is obtained by measuring light having a wavelength of 589 nm using an Abbe refractometer (a product of Atago Co., Ltd.).

When focusing on the results when Tni was 85° C. in FIG. 4, tr+tf steeply reduced as Δn increased from 0.11 to 0.13 (i.e., as the gap width d reduced from 2.90 μm to 2.48 μm). In contrast, when Δn further increased from 0.13 (i.e., when the gap width d further reduced), tr+tf reduced but its slope was gentle. This tendency can be explained by the relationships represented by the above expressions (1) and (2).

Based on the graph of FIG. 4, it can be understood that the time can be suitably shortened by setting the gap width d to 2.50 μm or less. In the case where the gap width d is thus reduced, it is desirable to employ a liquid crystal material having Δn of 0.11 or more in consideration of the color of the light after passing through the display panel PNL. However, as shown in FIG. 4, if Δn is less than 0.13, it can be expected to improve the response speed of the liquid crystal. Therefore, it is preferable to use a liquid crystal material having Δn of 0.16 or less, more preferably 0.13 or less.

As shown in FIG. 4, in the case of Tni=65° C., tr+tf was short than that of the case of Tni=85° C. This is because as the transition temperature is lower, the molecular weight of the liquid crystal material is lower and thus γ1 decreases.

Figures 5, 6:
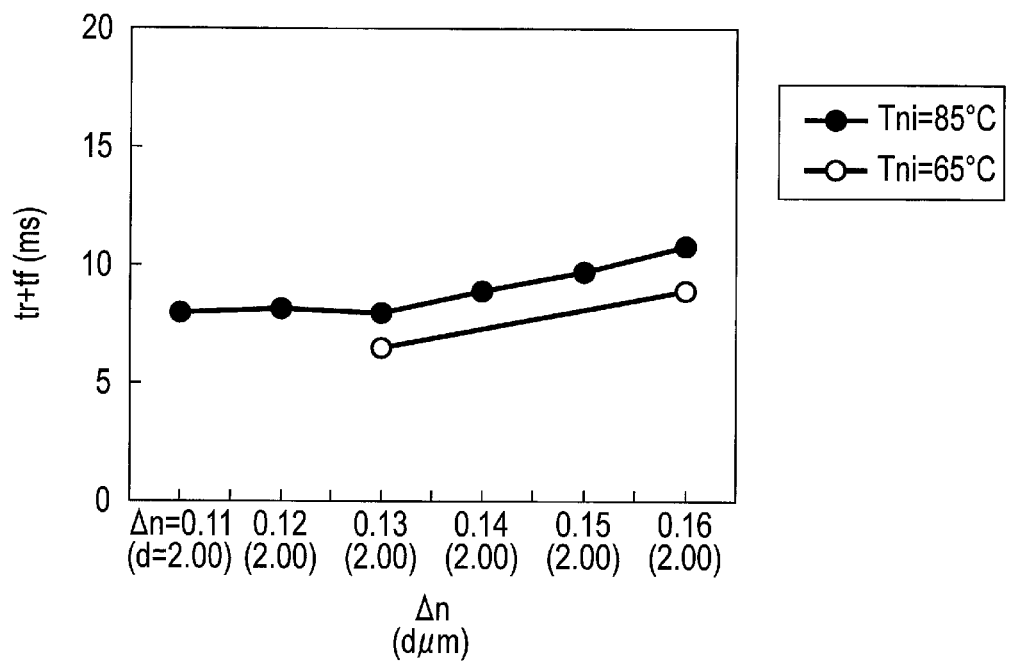
FIG. 5 is a graph showing the relationship between the refractive-index anisotropy $\Delta n$ and the response speed tr+tf when the gap width d is constant.
FIG. 6 is a table showing the relationship between $\Delta nd$ and light having passed through the display panel.

FIG. 5 is a graph showing results of simulation of a relationship between Δn and the time tr and tf, in the display panel PNL having the structure shown in FIGS. 2 and 3. In FIG. 5, the horizontal axis indicates the refractive-index anisotropy Δn and the vertical axis indicates the response time tr+tf [ms]. In FIG. 5, the gap width d was set constant to 2.00 μm. The value of the gap width d is written under each Δn. The simulations were executed when transition temperature Tni of the liquid crystal material was 85° C. and 65° C.

When focusing on the results when Tni was 85° C. in FIG. 5, tr+tf is substantially constant while Δn increased from 0.11 to 0.13. In contrast, when Δn further increased from 0.13, tr+tf turned to increase. As in the case of FIG. 4, this tendency also can be explained by the relationships represented by the above expressions (1) and (2).

As shown in FIG. 5, in the case where the gap width d is 2.00 μm, if Δn is set to 0.13, a good response speed that tr+tf is 10 μm or less, can be achieved. In this case, Δnd is 0.26 μm. Even when the gap width d is set to 2.5 μm or less as described above, and further Δn is set so that Δnd falls within a range of 0.20 μm to 0.31 μm, similarly, a good response speed can be achieved. It is preferable to set the gap width d and Δn so that Δnd becomes 0.30 μm or less, and more preferable to set the gap width d and Δn so that Δnd becomes 0.28 μm or less.

In FIG. 5, tr+tf became shorter in the case of Tni=65° C. than in the case of Tni=85° C. as in the case of FIG. 4. This is because as the transition temperature is lower, the molecular weight of the liquid crystal material is lower and thus γ1 decreases.

In order to improve the response speed, it has been found that if Δnd is set to be smaller than that of a general display panel (where Δnd is 0.32 to 0.34 μm), the color of light after passing through the display panel PNL changes. More specifically, if Δnd is set to be smaller than that of a general display device, bluish hue appears in the color of light after passing through the display panel PNL. As a result, faithful reproduction of the colors of an object to be displayed (color reproducibility) somewhat degrades. Their measures will be explained below.

FIG. 6 is a table showing a relationship between Δnd and the chromaticity of the light after passing through the display panel PNL. More specifically, this table shows a result of simulation of color chromaticities x and y, and luminance Y, in relation to the plurality of gap widths d and Δnd based on JIS 8722. For example, the color chromaticity x is shifted by −0.019 and the color chromaticity y is shifted by −0.023 when Δnd is 0.266 μm, which is in a range assumed in the embodiments as compared to the case of Δnd is 0.333 μm (d=2.5 μm) in a general display panel. Therefore, when Δnd is 0.266 μm, bluish hue appears in the light after passing through the display panel PNL (color shift).

In the embodiment, the color shift can be corrected by adjusting the configuration of each of the alignment films 14 and 24.

As one embodiment, when the color shift should be corrected by each of the alignment films 14 and 24, it can be done by coloring the first alignment film 14 yellow. Thus, in the first substrate SUB1 comprising the first alignment film 14 colored yellowish, the transmittance to light having a wavelength of 450 nm should preferably 85% or higher but 97% or less. Similarly, the second alignment film 24 may be colored yellow or both of alignment films 14 and 24 may be colored yellow. The configuration of coloring an alignment film yellow will be described below.

<Configuration of Alignment Film>

An alignment film according to one embodiment contains a first polyimide having a skeleton originated from aromatic tetracarboxylic acid as a tetracarboxylic acid component. The first polyimide comprises a repeating unit represented by the following formula (3):

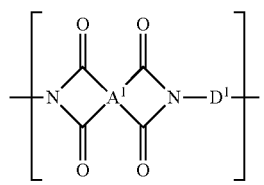
(3)

where, in formula (3), $A^1$ is a quadrivalent organic group and $D^1$ is a divalent organic group.

$A^1$ is a benzene ring or an aromatic group containing a benzene ring, or one of these compounds to which substituent bonds. $D^1$ is $Ar^0$ or $Ar^1$—Y—$Ar^2$, and here $Ar^0$ is an aromatic group, $Ar^1$ and $Ar^2$ are independently aromatic groups, and Y is a group containing nitrogen. Examples of the aromatic group represented by $Ar^0$, $Ar^1$ or $Ar^2$ are a benzene ring or an aromatic group containing a benzene ring, or one of these compounds to which substituent bonds. But Y may be bond directly to the aromatic group ($Ar^1$ or $Ar^2$), or may form a conjugated system to bond together.

The first polyimide can be formed on a substrate by heating a first polyamic acid-based compound, which is a precursor organic compound, to be imidized. The first polyamic acid-based compound is a polyamic acid or polyamic acid ester including a repeating unit represented by, for example, the following formula (4).

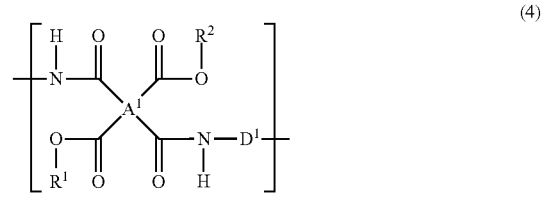

In formula (4), $A^1$ and $D^1$ are defined as in the formula (3), $R^1$ and $R^2$ are H or an alkyl chain of $C_mH_{2m+1}$, and m is 1 or 2.

Polyamic acid, which is the first polyamic acid-based compound, can be prepared by making tetracarboxylic dianhydride and diamine react with each other by a conventional method.

The tetracarboxylic dianhydride can be represented by the following formula (5).

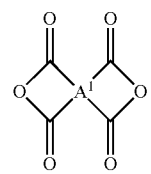
(5)

In formula (5), $A^1$ is as defined in the formula (3). Examples of the tetracarboxylic dianhydride include pyromellitic dianhydride.

The tetracarboxylic dianhydride should preferably contain two or more aromatic rings (such as a biphenyl group and a naphthyl group) to elongate the conjugated system in the polyimide. Examples of the tetracarboxylic dianhydride containing two or more aromatic groups include 4,4'-oxydiphthalic dianhydride, 3,3',4,4'-biphenyl tetracarboxylic dianhydride, 3,3',4,4'-benzophenone tetracarboxylic dianhydride, 3,3',4,4'-diphenylsulfone tetracarboxylic dianhydride, naphthalene-1,4,5,8-tetracarboxylic dianhydride, m-terphenyl-3,3',4,4'-tetracarboxylic dianhydride and p-terphenyl-3, 3',4,4'-tetracarboxylic dianhydride.

The first polyimide described above has a skeleton originated from electron-acceptable aromatic tetracarboxylic acid represented by the formula (5) as a tetracarboxylic acid component, and therefore an alignment film colored yellow can be prepared. Further, the specific resistance of the first polyimide tends to easily lower, and therefore it can be used as an alignment film, on which charge is not easily accumulated even if voltage is applied.

In some embodiments, the first polyimide includes a skeleton originated from diamine represented by the following formula (6) as a diamine component.

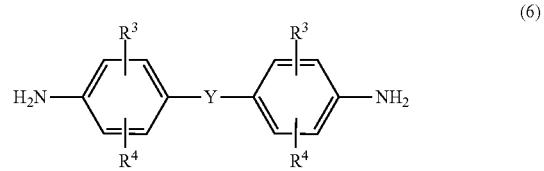
(6)

In the formula (6), Y is, as described above, a group containing nitrogen, and $R^3$ and $R^4$ each are independently H or an organic group. In some embodiments, in the formula (6), a phenylene group and nitrogen may form a conjugated system.

Examples of diamine include 4,4'-diaminodiphenylamine, bis(4-aminophenyl)methylamine, bis(4-aminophenyl)phenylamine, and bis(4-aminophenyl)-4-acetylaminophenylamine.

The first polyimide described above includes a skeleton originated from diamine comprising a group which contains nitrogen such as a secondary amino group or a tertiary amino group in its structure, as represented by the formula (6) above as a diamine component, and therefore an alignment film colored yellow can be prepared. Further, if a phenylene group and nitrogen in the diamine component represented by the formula (6) form a conjugated system, the conjugated system in the polyimide becomes long and an alignment film colored more yellowish can be prepared.

The polyamic acid ester can be prepared by, for example, making N,N-dimethylformamidedialkylacetal to react with the polyamic acid described above. Alternatively, the polyamic acid ester can also be prepared by a method disclosed in JP 2000-273172 A.

The first polyamic acid-based compound is dissolved or dispersed in an organic solvent to form a varnish for the alignment film, which is then applied on the surface of the first substrate SUB1. Examples of the organic solvent used for the varnish for alignment films include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethylsulfone, hexamethylsulfoxide, γ-butyrolactone, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, and 4-hydroxy-4-methyl-2-pentanone.

Hereinafter, a method of producing an alignment film according to embodiments will be described.

First, substrates (the first substrate SUB1 and the second substrate SUB2) are prepared. Next, the first polyamic acid-based compound dissolved into an organic solvent, i.e., the varnish for alignment films, is applied on the surface of a substrate using the printing methods, such as screen printing, flexographic printing, and ink jet printing.

Next, the first polyamic acid-based compound applied on the substrate is heated (first heating step). In the first heating step, the first polyamic acid-based compound is imidized into a first polyimide. Thus, the first polyimide is formed on the substrate. When the first heating step is carried out at a temperature of 170° C. or less, the first polyamic acid-based compound undesirably may not be converted sufficiently into the first polyimide. Therefore, the first heating step is carried out at a temperature higher than 170° C. The first heating step should preferably be a heating temperature of, for example, 200° C. or higher, more preferably, 220° C. or higher.

Next, the surface of the first polyimide is subjected to alignment processing to form an alignment film by imparting an alignment control capability to the first polyimide. The alignment processing is, for example, scrubbing with rubbing cloth (rubbing processing) and irradiating with ultraviolet light having short wavelength (photo-alignment processing).

Next, the first polyimide after the alignment processing is heated (second heating step). In the second heating step, unreacted monomers remaining in the first polyimide are removed. The second heating step is carried out at a temperature at 170° C. or higher, as in the first heating step. The second heating step should preferably be carried out at, for example, 200° C. or higher, more preferably 220° C. or higher.

In the above-described method of preparing the alignment film, the alignment film can be colored yellow also by prolonging the total time of the first heating step and the second heating step. In order to color an alignment film yellow, the total time of the first heating step and the second heating step should preferably be 40 minutes or more, and more preferably, 60 minutes or more. Note here that if the first heating step is prolonged, the alignment processing after the first heating step, and the second heating step may be adversely affected. Therefore, when the heating step is prolonged, the second heating step should preferably be prolonged. For example, when the total time of the first heating step and the second heating step is 60 minutes, the first heating step may be set to 20 minutes, whereas the second heating step may be set to 40 minutes. Here, in both the steps, the temperature is 200° C.

In some embodiments, the thickness of the alignment film is, for example, 100 nm or more. With a thickness of 100 nm or more, the alignment film can contain a great number of components (for example, the first polyimide) which can color itself yellow, the alignment film can be colored more yellowish.

Alignment films according to other embodiments include polymer compounds having an azobenzene skeleton, a cinnamate skeleton or a stilbene skeleton. A polymer compound which has such a skeleton is formed on a substrate by, for example, heating a thermosetting compound containing the monomer which has an azobenzene skeleton, a cinnamate skeleton or a stilbene skeleton.

Examples of the monomer having a cinnamate skeleton include 4-(8-hydroxyoctyloxy)cinnamic acid methyl ester, 4-(6-hydroxyhexyloxy)cinnamic acid methyl ester, 4-(4-hydroxybutyloxy)cinnamic acid methyl ester, 4-(3-hydroxypropyloxy)cinnamic acid methyl ester, 4-(2-hydroxyethyloxy)cinnamic acid methyl ester, 4-hydroxymethyloxycinnamic acid methyl ester, 4-hydroxycinnamic acid methyl ester, 4-(8-hydroxyoctyloxy)cinnamic acid ethyl ester, 4-(6-hydroxyhexyloxy)cinnamic acid ethyl ester, 4-(4-hydroxybutyloxy)cinnamic acid ethyl ester, 4-(3-hydroxypropyloxy)cinnamic acid ethyl ester, 4-(2-hydroxyethyloxy)cinnamic acid ethyl ester, 4-hydroxymethyloxycinnamic acid ethyl ester, 4-hydroxycinnamic acid ethyl ester, 4-(8-hydroxyoctyloxy)cinnamic acid phenyl ester, 4-(6-hydroxyhexyloxy)cinnamic acid phenyl ester, 4-(4-hydroxybutyloxy)cinnamic acid phenyl ester, 4-(3-hydroxypropyloxy)cinnamic acid phenyl ester, 4-(2-hydroxyethyloxy)cinnamic acid phenyl ester, 4-hydroxymethyloxycinnamic acid phenyl ester, 4-hydroxycinnamic acid phenyl ester, 4-(8-hydroxyoctyloxy)cinnamic acid biphenyl ester, 4-(6-hydroxyhexyloxy)cinnamic acid biphenyl ester, 4-(4-hydroxybutyloxy)cinnamic acid biphenyl ester, 4-(3-hydroxypropyloxy)cinnamic acid biphenyl ester, 4-(2-hydroxyethyloxy)cinnamic acid biphenyl ester, 4-hydroxymethyloxycinnamic acid biphenyl ester, 4-hydroxycinnamic acid biphenyl ester, cinnamic acid 8-hydroxyoctyl ester, cinnamic acid 6-hydroxyhexyl ester, cinnamic acid 4-hydroxybutyl ester, cinnamic acid 3-hydroxypropyl ester, cinnamic acid 2-hydroxyethyl ester and cinnamic acid hydroxymethyl ester.

Examples of the monomer having an azobenzene skeleton include 4-(8-hydroxyoctyloxy)azobenzene, 4-(6-hydroxyhexyloxy)azobenzene, 4-(4-hydroxybutyloxy)azobenzene, 4-(3-hydroxypropyloxy)azobenzene, 4-(2-hydroxyethyloxy)azobenzene, 4-hydroxymethyloxyazobenzene, and 4-hydroxyazobenzene.

The polymer compounds described above have an azobenzene skeleton, a cinnamate skeleton, or a stilbene skeleton, and therefore an alignment film colored yellow can be prepared and then subjected to photo-alignment processing to impart alignment control capability thereto.

In some embodiments, the alignment film includes an upper layer and a lower layer. The alignment film including the upper layer and the lower layer can be formed by using a varnish for alignment films, which further contains a second polyamic acid-based compound, which is polyamic acid or a polyamic acid ester in addition to the first polyamic acid-based compound or the polymer compound described above, as a polyamic acid-based compound. Note that the varnish for alignment films may also contain a third polyamic acid-based compound in place of the second polyamic acid-based compound, but the case where the first polyamic acid-based compound and the second polyamic acid-based compound are contained will be described below.

When the first polyamic acid-based compound and the second polyamic acid-based compound are contained, it is arranged that the first polyamic acid-based compound has a polarity higher (larger surface energy) than the second polyamic acid-based compound. In this manner, when the first polyamic acid-based compound and the second polyamic acid-based compound are co-present, they are separated into phases. Here, the first polyamic acid-based compound has a higher affinity (higher intramolecular polarity) with an inorganic material film of ITO, silicon oxide, silicon nitride or the like to form a pixel electrode, or an organic passivation film which uses an organic resin, in the liquid crystal display device, and therefore the first polyamic acid-based compound becomes the lower layer. Usually, when a polyamic acid ester and a polyamic acid are co-present, the polyamic acid ester (lower intramolecular polarity) forms an upper layer and the polyamic acid forms a lower layer. Or when two kinds of polyamic acids are co-present, and the diamine skeleton of one polyamic acid contain nitrogen, oxygen or fluorine whereas the diamine skeleton of the other polyamic acid contains a little or no nitrogen, oxygen or fluorine, the one polyamic acid forms a lower layer, and the other polyamic acid forms an upper layer. Moreover, even if oxygen or fluorine exists in the other polyamic acid, but the amount thereof is less than that of oxygen or fluorine in the diamine skeleton of the one polyamic acid, the one polyamic acid forms the lower layer and the other polyamic acid forms the upper layer.

As is clear from the descriptions provided above, in an alignment film of a double-layer structure, the lower layer means a layer in direct contact with an applicable object (for example, an ITO film, an inorganic material film, or an organic passivation film), and the upper layer means a layer in contact with the lower layer. Note that the border region between the upper layer and the lower layer is in a state where the first polyimide and the second polyimide are mixed, and thus the alignment film is not strictly defined as of two layers.

In some embodiment, the alignment film includes an upper layer and a lower layer, and the lower layer contains the first polyimide. For example, if the first polyimide is contained in the lower layer of the alignment film of the liquid crystal display device, which has a frame frequency of 90 Hz or higher, the first polyimide has low specific resistance as described above, and the charge is not easily accumulated in the alignment film. Thus, non-uniformity in display, which may be caused by charge accumulated on the alignment film, does not easily occur.

Moreover, the lower layer included in the alignment film is thicker than the upper layer. When the lower layer containing a component (for example, the first polyimide) which can color the alignment film yellow, is thickened, the alignment film can be colored more yellowish as compared to the case where the thickness of the lower layer is equivalent to or less than that of the upper layer. Therefore, non-uniformity in display, which may be caused by charge accumulated on the alignment film, does not even more easily occur.

In some embodiments, the alignment film includes an upper layer and a lower layer, and the upper layer contains a second polyimide which has a cyclobutane skeleton. The second polyimide includes a repeating unit represented by the following formula (7).

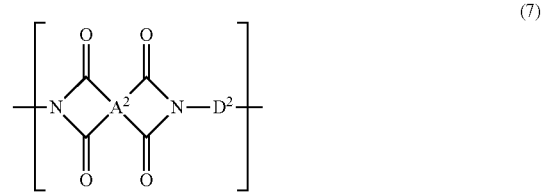

(7)

In the formula (7), $A^2$ is a quadravalent organic group and $D^2$ is a divalent organic group. $A^2$ is a compound in which a substituent is bonded to cyclobutane or cyclobutane, and $D^2$ is as defined by $D^1$.

The second polyimide is formed on a substrate by heating the second polyamic acid-based compound, which is a precursor organic compound, to be imidized. The second polyamic acid-based compound can be prepared by making tetracarboxylic dianhydride, which has a cyclobutane skeleton, and diamine react with each other by a conventional method.

Examples of the tetracarboxylic dianhydride which has a cyclobutane skeleton include 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride and 1,2,3,4-tetramethyl-1,2,3,4-cyclobutanetetracarboxylic dianhydride.

The second polyamic acid-based compound is formed on a substrate as the second polyimide using the above-described method of preparing an alignment film.

The second polyimide described above has a cyclobutane skeleton, and therefore alignment control capability is imparted by photo-alignment processing. Moreover, the specific resistance of the second polyimide becomes high more easily as compared with the first polyimide, and therefore it is used as an alignment film, on which charge can be easily accumulated if voltage is applied.

In some embodiment, the alignment film includes an upper layer and a lower layer, and the upper layer contains the second polyimide which has a cyclobutane skeleton and the lower layer contains the first polyimide. For example, if the second polyimide is contained in the upper layer of the alignment film of the liquid crystal display device, which has a frame frequency of, for example, 60 Hz or less, a display failure such as flicker does not occur easily as described above because the second polyimide has high specific resistance and the charge is easily accumulated on the alignment film.

In some embodiment, the alignment film includes an upper layer and a lower layer, and the upper layer contains the third polyimide which has an azobenzene skeleton, a cinnamate skeleton, or a stilbene skeleton and the lower layer contains the first polyimide. The third polyimide includes a repeating unit represented by the following formula (8).

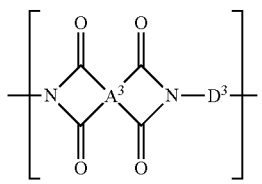

(8)

In the formula (8), $A^3$ is a quadravalent organic group and $D^3$ is a divalent organic group. $A^3$ or $D^3$ is a compound which has an azobenzene skeleton, a cinnamate skeleton or a stilbene skeleton.

The third polyimide is formed on a substrate by heating the third polyamic acid-based compound, which is a precursor organic compound, to be imidized. Polyamic acid, which is the third polyamic acid-based compound can be prepared by making tetracarboxylic dianhydride and diamine react with each other by a conventional method. In this case, one or both of tetracarboxylic dianhydride and diamine has an azobenzene skeleton, a cinnamate skeleton or a stilbene skeleton.

Examples of the diamine which has an azobenzene skeleton include 4,4'-diaminoazobenzene. Examples of the diamine which has a stilbene skeleton include 2,2'-diaminostilbene and 4,4'-diaminostilbene.

The third polyimide has an azobenzene skeleton, a cinnamate skeleton or a stilbene skeleton, and therefore an alignment film colored yellow can be formed, and alignment control capability is imparted thereto by photo-alignment processing.

Therefore, when the third polyimide is used in the upper layer and the first polyimide is used in the lower layer, the upper layer and the lower layer contain the component which can color the alignment film yellow to color the alignment film more yellowish.

Figure 7:
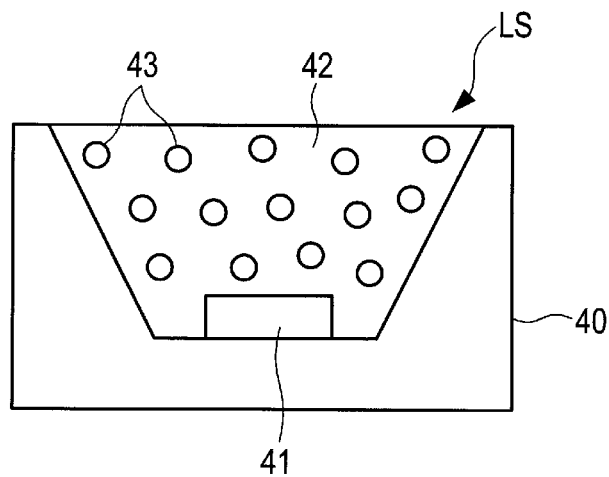
FIG. 7 is a cross sectional view schematically showing a configuration example of a light source.

As to the structure of the liquid crystal display device, FIG. 7 is a cross sectional view schematically showing a configuration example of a light source LS, which is YAG (yttrium-aluminum-garnet-based phosphor)-LED. A YAG-LED can be used as the light source LS for the liquid crystal display device 1. The light source LS comprises a cup 40. On a bottom surface of the cup 40, a light-emitting device 41 which emits blue light is provided. Inside the cup 40, a resin material 42 containing a plurality of yellow phosphors 43 is provided. The yellow phosphor 43 is excited in response to light of the light emitting device 41, to emit light in yellow. As blue light emitted from the light emitting device 41 is mixed with the yellow light emitted from the yellow phosphor 43 are mixed together, and thus white light is generated.

Figure 8:
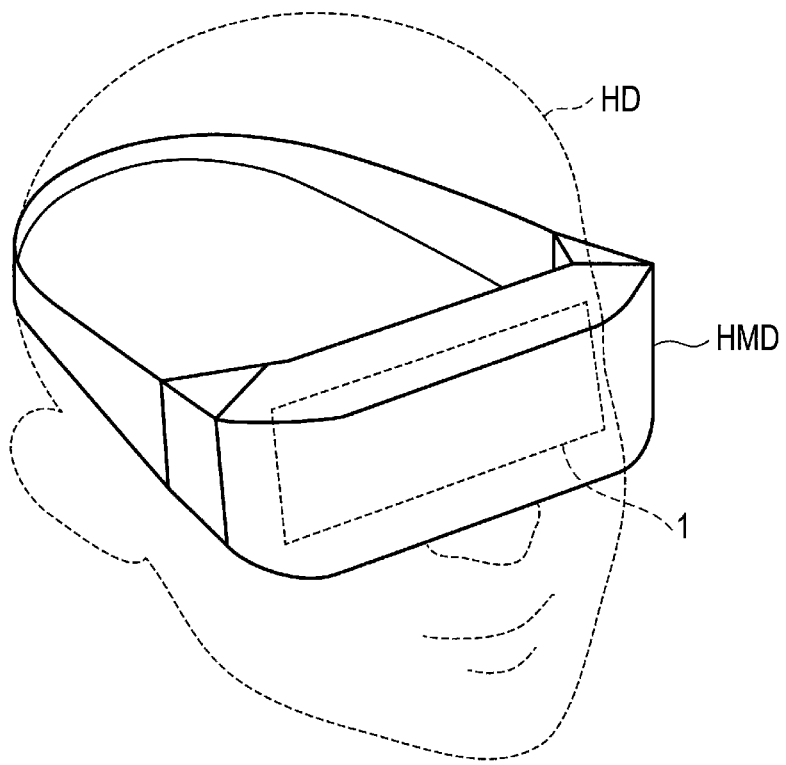
FIG. 8 is a perspective view schematically showing an example of use of the liquid crystal display device of the present embodiment.

FIG. 8 is a perspective view schematically showing the use of the liquid crystal display device 1. Here, an example will be described, in which the liquid crystal display device 1 is used as a head mounted display HMD. The head mounted display HMD is mounted on the head HD of a user. Thus, the user with the head mounted display HMD mounted thereon can view images displayed on the screen of the liquid crystal display device 1. The head mounted display HMD of such a type is appropriate for the use of virtual reality (VR), augmented reality (AR), or mixed reality (MR). To the head mounted display HMD, power is supplied from an outside via, for example, a cable. But, the head mounted display HMD may include a battery built therein for power supply.

In the liquid crystal display device 1 used for VR, AR or MR, a high sense of immersion can be obtained if the display quality of moving images is improved. To improve the display quality of moving images, it is effective to improve the moving-image blur time (blur edge time: BET). For example, the blur edge time can be improved by raising the frame frequency to rewrites the voltage of the pixel electrode PE. For example, the liquid crystal display device 1 should preferably have a frame frequency of 90 Hz or higher.

Moreover, the blur edge time can be further improved by blinking the illumination device BL when displaying moving images. For blinking, the controller CT controls the light sources LS to set, for example, the lighting period of the illumination device BL to a predetermined duty ratio (for example, 10%).

In general, as the light source of the liquid crystal display device, light-emitting diodes which emit white light are used. Particularly, in recent years, in order to expand the color gamut, a phosphor conversion type light-emitting diode (phosphor converting-white LED) comprising a light-emitting device which emits blue light, a green phosphor which emits green light, and a red phosphor which emits red light, is used. However, the phosphors used in this kind of light-emitting diode differs from each other in the response speed to electric current depending on the structure of the compounds. Here, for a light source blinking at high speed, such a type of light source which uses phosphors of a plurality of colors is not suitable. Especially, the red phosphor used in this kind of light-emitting diode generally has low response, and therefore when carrying out blinking, red light may remain as persistence.

On the other hand, the above-described YAG-LED can generate white light without using red light, and therefore the persistence of red light is not produced. Thus, the YAG-LED can generate white light by only one light-emitting diode (blue), there is no difference in the response speed, which depends on the compound structure of the phosphor. The YAG-LED is advantageous even when carrying out blinking. Moreover, to generate white light using light-emitting diodes of different colors, a wide large space for accommodating these light-emitting devices is required in the frame area. On the other hand, the light source LS shown in FIG. 7 includes one light-emitting device 41 which emits blue light, and therefore it is small in size, which contributes also to downsizing of the frame area.

EXAMPLES

Examples of the embodiments will now be described.
First, synthetic examples of the polyamic acid-based compound will be provided.

Synthetic Example 1

An N-methyl-2-pyrrolidone (NMP) solution containing 100 parts by mol of 1,3-dimethyl-1,2,3,4-cyclobutanetetra-carboxylic dianhydride and an NMP solution containing 100 parts by mol of p-phenylenediamine were mixed, and the mixture was made to react at room temperature for 8 hours, thus generating a polyamic acid. Unreacted monomers and low-molecular components were removed from the resultant, and a polyamic acid solution of 15% by weight of solid content concentration was obtained.

Synthetic Example 2

An NMP solution containing 100 parts by mol of pyromellitic dianhydride and an NMP solution containing 100 parts by mol of 4,4'-diaminoazobenzene were mixed, and the mixture was made to react at room temperature for 8 hours, thus generating a polyamic acid. Unreacted monomers and low-molecular components were removed from the resultant, and a polyamic acid solution of 15% by weight of solid content concentration was obtained.

Synthetic Example 3

An NMP solution containing 70 parts by mol of 1,3-dimethyl-1,2,3,4-cyclobutanetetracarboxylic dianhydride and 30 parts by mol of pyromellitic dianhydride, and an NMP solution of 100 parts by mol of 4,4'-diaminodiphenylamine were made to react at room temperature for 8 hours, thereby generating a polyamic acid. Unreacted monomers and low-molecular components were removed from the resultant, and thus a polyamic acid solution of 15% by weight of solid content concentration was obtained.

Synthetic Example 4

An NMP solution containing 80 parts by mol of 1,3-dimethyl-1,2,3,4-cyclobutanetetracarboxylic dianhydride and 20 parts by mol of pyromellitic dianhydride, and an NMP solution containing 80 parts by mol of 4,4'-diaminodiphenylamine and 20 parts by mol of 4,4'-diaminodiphenyl ether were made to react at room temperature for 8 hours, thereby generating a polyamic acid. Unreacted monomers and low-molecular components were removed from the resultant, and thus a polyamic acid solution of 15% by weight of solid content concentration was obtained.

Synthetic Example 5

An NMP solution containing 70 parts by mol of 1,3-dimethyl-1,2,3,4-cyclobutanetetracarboxylic dianhydride and 30 parts by mol of pyromellitic dianhydride, and an NMP solution containing 80 parts by mol of bis(4-aminophenyl)methylamine and 20 parts by mol of 4,4'-diaminodiphenyl ether were made to react at room temperature for 8 hours, thereby generating a polyamic acid. Unreacted monomers and low-molecular components were removed from the resultant, and thus a polyamic acid solution of 15% by weight of solid content concentration was obtained.

Synthetic Example 6

An NMP solution containing 70 parts by mol of 1,3-dimethyl-1,2,3,4-cyclobutanetetracarboxylic dianhydride and 30 parts by mol of pyromellitic dianhydride, and an NMP solution containing 80 parts by mol of 4,4'-diaminodiphenylamine and 20 parts by mol of 4,4'-diaminodiphenyl ether were made to react at room temperature for 8 hours, thereby generating a polyamic acid. Unreacted monomers and low-molecular components were removed from the resultant, and thus a polyamic acid solution of 15% by weight of solid content concentration was obtained.

Synthetic Example 7

An NMP solution containing 70 parts by mol of 1,3-dimethyl-1,2,3,4-cyclobutanetetracarboxylic dianhydride and 30 parts by mol of pyromellitic dianhydride, and an NMP solution containing 100 parts by mol of bis(4-aminophenyl)-4-acetylaminophenylamine were made to react at room temperature for 8 hours, thereby generating a polyamic acid. Unreacted monomers and low-molecular components were removed from the resultant, and thus a polyamic acid solution of 15% by weight of solid content concentration was obtained.

Synthetic Example 8

An NMP solution containing 70 parts by mol of 1,3-dimethyl-1,2,3,4-cyclobutanetetracarboxylic dianhydride and 30 parts by mol of pyromellitic dianhydride, and an NMP solution containing 100 parts by mol of bis(4-aminophenyl)phenylamine were made to react at room temperature for 8 hours, thereby generating a polyamic acid. Unreacted monomers and low-molecular components were removed from the resultant, and thus a polyamic acid solution of 15% by weight of solid content concentration was obtained.

Synthetic Example 9

An NMP solution containing 100 parts by mol of 1,3-dimethyl-1,2,3,4-cyclobutanetetracarboxylic dianhydride, and an NMP solution containing 80 parts by mol of 4,4'-diaminodiphenylamine and 20 parts by mol of 4,4'-diaminodiphenyl ether were mixed, and the mixture was made to react at room temperature for 8 hours, thus generating a polyamic acid. Unreacted monomers and low-molecular components were removed from the resultant, and a polyamic acid solution of 15% by weight of solid content concentration was obtained.

Synthetic Example 10

An NMP solution containing 70 parts by mol of 1,3-dimethyl-1,2,3,4-cyclobutanetetracarboxylic dianhydride and 30 parts by mol of pyromellitic dianhydride, and an NMP solution containing 100 parts by mol of 4,4'-diaminodiphenyl ether were mixed, and the mixture was made to react at room temperature for 8 hours, thus generating a polyamic acid. Unreacted monomers and low-molecular components were removed from the resultant, and a polyamic acid solution of 15% by weight of solid content concentration was obtained.

Examples 1 to 12 and Comparative Examples 1 and 2

An upper layer component and a lower layer component were mixed at a weight ratio indicated in Table 1 below, to prepare coating liquids. The coating liquids were each applied to two glass substrates and heated at 200° C. to be imidized (first heating step). The imidization rate was 80% in each case. The imidized films are each irradiated an ultraviolet light having short wavelength, and thus subjected to photo-alignment processing. After the photo-alignment processing, the films were heated at 200° C. to remove residues (second heating step). On a circumferential edge of one of the glass substrates, on which the alignment film was thus formed, a sealing member was prepared provided, and the liquid crystal material was dropped thereon. Then, the other glass substrate was attached thereto so as to enclose it, and thus test cells were produced. As the liquid crystal, a positive type liquid crystal material having a refractive-index anisotropy Δn of 0.11 was used. Note that Table 1 provided below indicates a total time of the first heating step and the second heating step as the heating time.

Each of the test cells prepared was measured in spectral transmissivity in a rage of 380 to 780 nm using a spectrophotometer U-3310 of Hitachi, and the chromaticities x and y were calculated by the method set forth in JIS Z 8722. Based on the differences Δx and Δy between the chromaticities x and y thus obtained and the reference light source, the correction amount Δw of each test cell was defined by the following formula (9) and converted into numerical values.

$$\Delta w = (\Delta x^2 = \Delta y^2)^{1/2} \qquad (9)$$

The correction amount Δw of each test cell was evaluated in four steps as follows. For example, the evaluation results are indicated by A, B, C, and D, A being greater in the correction amount, whereas D being less.

A: 0.030 or higher
B: 0.020 or higher but less than 0.030
C: 0.010 or higher but less than 0.020
D: less than 0.010

The results were as indicated in Table 1.

TABLE 1

|  | Upper layer component | Lower layer component | Upper layer: Lower layer (weight ratio) | Heating time (min) | Correction amount Δw | Evaluation |
|---|---|---|---|---|---|---|
| Ex. 1 | Synthetic Ex. 1 | Synthetic Ex. 4 | 4:6 | 50 | 0.012 | C |
| Ex. 2 | Synthetic Ex. 1 | Synthetic Ex. 3 | 4:6 | 50 | 0.018 | C |
| Ex. 3 | Synthetic Ex. 1 | Synthetic Ex. 4 | 4:6 | 100 | 0.024 | B |
| Ex. 4 | Synthetic Ex. 1 | Synthetic Ex. 3 | 4:6 | 100 | 0.036 | A |
| Ex. 5 | Synthetic Ex. 1 | Synthetic Ex. 4 | 5:5 | 50 | 0.011 | C |
| Ex. 6 | Synthetic Ex. 1 | Synthetic Ex. 3 | 3:7 | 50 | 0.020 | B |
| Ex. 7 | Synthetic Ex. 1 | Synthetic Ex. 5 | 4:6 | 50 | 0.015 | C |
| Ex. 8 | Synthetic Ex. 1 | Synthetic Ex. 6 | 4:6 | 50 | 0.016 | C |
| Ex. 9 | Synthetic Ex. 1 | Synthetic Ex. 7 | 4:6 | 50 | 0.020 | B |
| Ex. 10 | Synthetic Ex. 1 | Synthetic Ex. 8 | 4:6 | 50 | 0.020 | B |
| Ex. 11 | Synthetic Ex. 2 | Synthetic Ex. 4 | 5:5 | 20 | 0.023 | B |
| Ex. 12 | Synthetic Ex. 2 | Synthetic Ex. 10 | 5:5 | 20 | 0.016 | C |
| Comp. Ex. 1 | Synthetic Ex. 1 | Synthetic Ex. 9 | 4:6 | 50 | 0.004 | D |
| Comp. Ex. 2 | Synthetic Ex. 1 | Synthetic Ex. 10 | 4:6 | 50 | 0.005 | D |

As explained above in detail, according to the present embodiments, even if Δnd is set smaller than that of general display panels and blueish hue is generated in the light after passing through the display panel PNL, the color can be corrected by adjusting the structure of the alignment film. Thus, a liquid crystal display device with improved response speed and color reproducibility, that is, namely, improved display quality, can be provided.

In the above embodiments set forth above, the conditions described in connection with the gap width d, refractive-index anisotropy Δn, Δnd, the rotational viscosity coefficient γ1, the transition temperature Tni and the like are not necessarily required to be satisfied all at the same time. Even if at least some of these are satisfied, advantageous effects according to such conditions can be obtained.

The present embodiments do not prevent application of individual technical ideas disclosed in the embodiments to other types of display devices. As liquid crystal display devices of other kinds, for example, a reflective liquid crystal display device which displays images by using external light, a liquid crystal display device comprising functions of both transmissive and reflective types, and the like are assumed.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate;
a second substrate disposed to oppose the first substrate;
a layer of liquid crystal located between the first substrate and the second substrate; and
an alignment film disposed on the first substrate so as to be in contact with the layer of the liquid crystal,
the liquid crystal having a refractive-index anisotropy Δn of 0.11 or more, the layer of the liquid crystal having a thickness d of 2.5 μm or less, and a product Δnd of the refractive-index anisotropy Δn and the thickness d being 0.20 μm or more but 0.31 μm or less,
the alignment film colored yellow by containing a first polyimide which has a skeleton originated from an aromatic tetracarboxylic acid as a tetracarboxylic acid component, or a polymer compound which has an azobenzene skeleton, a cinnamate skeleton or a stilbene skeleton, chromaticities x and y of the yellow color having been adjusted by adjusting a structure of a conjugated system formed in the respective skeleton, and
a transmissivity of light having a wavelength of 450 nm in the first substrate and the alignment film is 85% or more but 97% or less.

2. The device of claim 1, wherein
the alignment film includes an upper layer and a lower layer, and
the lower layer is closer to the first substrate than the upper lave id contains the first polyimide.

3. The device of claim 2, wherein the lower layer is thicker than the upper layer.

4. The device of claim 1, wherein the alignment film has a thickness of 100 nm or more.

5. The device of claim 1, wherein
the first polyimide has a skeleton originated from a diamine represented by a formula (1) as a diamine component,

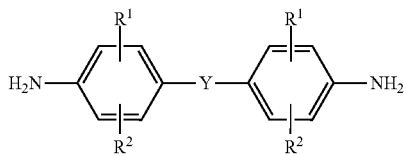 (1)

wherein in the formula (1), Y is a group containing nitrogen, and $R^1$ and $R^2$ are independently H or an organic group.

6. The device of claim 5, wherein in the formula (1), one of the phenylene groups and a nitrogen atom contained by the Y form a conjugated system.

7. The device of claim 1, wherein the alignment film includes an upper layer and a lower layer, and the upper layer contains a second polyimide having a cyclobutane skeleton and the lower layer contains the first polyimide.

8. The device of claim 1, wherein
the alignment film includes an upper layer and a lower layer,
the lower layer is closer to the first substrate than the upper layer, and
the upper layer contains a third polyimide having an azobenzene skeleton, a cinnamate skeleton or a stilbene skeleton, and the lower layer contains the first polyimide.

9. The device of claim 1, further comprising a backlight, wherein the backlight contains a yttrium-aluminum-garnet-based phosphor.

10. The device of claim 1, wherein
the first substrate comprises a common electrode and a pixel electrode, and the common electrode is located between the layer of the liquid crystal and the pixel electrode, aid a portion of the pixel electrode is not superimposed on the common electrode.

* * * * *